United States Patent [19]

Walker

[11] Patent Number: 4,552,672
[45] Date of Patent: Nov. 12, 1985

[54] METHOD AND COMPOSITION FOR ACIDIZING SUBTERRANEAN FORMATIONS

[75] Inventor: Michael L. Walker, Duncan, Okla.

[73] Assignee: Halliburton Company, Duncan, Okla.

[21] Appl. No.: 622,943

[22] Filed: Jun. 21, 1984

[51] Int. Cl.$^4$ ............................................. E21B 43/27
[52] U.S. Cl. ........................... 252/8.55 C; 252/389 R; 422/12
[58] Field of Search ................... 252/8.55 C, 143, 147, 252/389.54; 422/12

[56] References Cited

U.S. PATENT DOCUMENTS

| | | | |
|---|---|---|---|
| 1,915,148 | 6/1933 | Berliner et al. | 252/389.54 X |
| 2,431,715 | 12/1947 | Wachter | 252/389.54 X |
| 2,814,593 | 11/1957 | Beiswanger et al. | 252/8.55 |
| 2,869,978 | 1/1959 | Fischer | 252/389.54 X |
| 3,506,581 | 4/1970 | Kucera | 252/8.55 X |
| 3,779,935 | 12/1973 | McDougall et al. | 252/391 X |
| 3,959,170 | 5/1976 | Mago et al. | 252/389.54 X |
| 4,498,997 | 2/1985 | Walker | 252/8.55 |

Primary Examiner—Herbert B. Guynn
Attorney, Agent, or Firm—Robert A. Kent; Thomas R. Weaver

[57] ABSTRACT

The present invention relates to a method of acidizing a subterranean formation or well bore employing an acidic solution containing a stabilized corrosion inhibitor composition comprising an inhibiting effective amount of an acetylenic alcohol, a quaternary ammonium compound, an aromatic hydrocarbon, an antimony compound, and a stabilizer which substantially prevents precipitation of solubilized antimony-containing compounds from aqueous solutions.

15 Claims, No Drawings

METHOD AND COMPOSITION FOR ACIDIZING SUBTERRANEAN FORMATIONS

CROSS-REFERENCE TO RELATED APPLICATIONS

This application is related to Applicant's copending patent application Ser. No. 507,388 entitled "Method and Composition for Acidizing Subterranean Formations" filed June 24, 1983 now U.S. Pat. No. 4,498,997.

BACKGROUND OF THE INVENTION

The present invention relates to a method of stabilizing a corrosion inhibitor in an acidizing treatment of a subterranean formation or well bore employing selected compounds which substantially reduce the potential for precipitate formation from the corrosion inhibitor upon acid spending of the acidic solution.

Acidizing and fracturing treatments using aqueous acidic solutions commonly are carried out in hydrocarbon-containing subterranean formations penetrated by a well bore to accomplish a number of purposes, one of which is to increase the permeability of the formation. The increase in formation permeability normally results in an increase in the recovery of hydrocarbons from the formation.

In acidizing treatments, aqueous acidic solutions are introduced into the subterranean formation under pressure so that the acidic solution flows into the pore spaces of the formation. The acidic solution reacts with acid-soluble materials contained in the formation which results in an increase in the size of the pore spaces and an increase in the permeability of the formation.

In fracture acidizing treatments, one or more fractures are produced in the formation and the acidic solution is introduced into the fracture to etch flow channels in the fracture face. The acid also enlarges the pore spaces in the fracture face and in the formation.

A problem associated with acidizing subterranean formations is the corrosion by the acidic solution of the tubular goods in the well bore and the other equipment used to carry out the treatment. The expense of repairing or replacing corrosion damaged equipment is extremely high. The corrosion problem is exacerbated by the elevated temperatures encountered in deeper formations.

Various methods have been proposed to decrease the corrosion problem related to acidizing treatments, however, the corrosion inhibitors employed generally are effective only at temperature levels below about 250° F. It would be desirable to provide a composition and method for acid treating a subterranean formation which overcomes at least some of the corrosion problem resulting from contact of the aqueous acidic treating solutions with ferrous and other metals while preventing further problems caused by precipitation of various compounds from the acidic solutions upon acid spending.

SUMMARY OF THE INVENTION

The present invention relates to a method of acidizing a subterranean formation employing an acidic solution containing a stabilized corrosion inhibitor which substantially reduces the corrosive effect of the acid on ferrous and other metals without reducing the effectiveness of the acidic solution in treating the subterranean formation and which substantially prevents precipitation of solids from the corrosion inhibitor upon acid spending. The acidizing solution is introduced into a subterranean formation through a well bore at a flow rate and pressure sufficient to permit the acid to dissolve formation materials or foreign material in the vicinity of the well bore. The acidic solution can comprise, for example, a solution of hydrochloric acid, or mixtures of hydrochloric acid with hydrofluoric acid, acetic acid, formic acid or formic and hydrofluoric acid, sulfuric acid, formic acid, acetic acid, mixtures thereof and the like. The inhibitor comprises a composition comprising corrosion-reducing effective amounts of one or more acetylenic alcohols, a quaternary ammonium compound, an aromatic hydrocarbon having high oil-wetting characteristics, an antimony compound and a stabilizer comprising at least one member selected from the group consisting of reactive fluoride-containing compounds, compounds having alpha-hydroxy or beta-hydroxy organic acid functional groups or non-organic acid polyhydroxy compounds having from 3 to 9 carbon atoms. The antimony compound can comprise any antimony compound which is capable of activation by the other constituents of the inhibitor. The stabilized corrosion inhibitor is particularly effective in reducing the corrosive effects of acidic solutions in contact with ferrous metals where the temperature at which the metal and acid are in contact is between about 150° F. and 500° F.

DESCRIPTION OF THE PREFERRED EMBODIMENT

In accordance with the present invention, there is provided an aqueous acidic solution comprising an aqueous fluid, an acid and a stabilized corrosion inhibitor containing an activated antimony compound.

The acids employed in the practice of the present invention can comprise hydrochloric acid or mixtures of hydrochloric acid with hydrofluoric and formic acid, acetic acid, formic acid, hydrofluoric acid or mixtures of these acids and the like.

The corrosion inhibitor comprises a composition comprising effective amounts of one or more acetylenic alcohols, a quaternary ammonium compound, an aromatic hydrocarbon having high oil-wetting characteristics, an antimony compound which is capable of activation by the other constituents of the corrosion inhibitor and a selected stabilizer.

The stabilizer comprises at least one member selected from the group consisting of a reactive fluoride-containing compound, compounds having alpha-hydroxy or beta-hydroxy organic acid functional groups or non-organic acid polyhydroxy compounds having from 3 to 9 carbon atoms. The fluoride-containing compound can comprise, for example, hydrofluoric acid, ammonium bifluoride, sodium fluoride, potassium fluoride, ammonium fluoride, transition metal fluorides, rare earth fluorides, alkaline earth fluorides and the like. The fluoride source can comprise substantially any compound which is capable of solubilization in the presence of the antimony compound and other constituents of the corrosion inhibitor without adversely affecting the operability of the corrosion inhibitor in the acid. The compounds having alpha-hydroxy or beta-hydroxy organic acid functional groups can comprise, for example, citric acid, citric acid salts, tartaric acid, tartaric acid salts, glycolic acid, glycolic acid salts, lactic acid, lactic acid salts, 3-hydroxyl propionic acid, 3-hydroxyl butanoic acid, 3,4-dihydroxy 1,6-hexanedioic acid and the like.

The non-organic acid polyhydroxy compounds can comprise, for example, sorbitol, glycerol, glucose, mannose, ribitol, erythritol, mannitol, perseitol, iditol, altritol, xylitol and the like.

The stabilizer is admixed with the corrosion inhibitor in a molar ratio of generally about one mole of either fluoride ion, alpha-hydroxy or beta-hydroxy organic acid functional groups, non-organic acid polyhydroxy compounds or an admixture thereof per mole of antimony present in the corrosion inhibitor. Larger quantities of the stabilizer may be utilized and, preferably, an amount slightly in excess of the molar concentration of the antimony which is present is utilized. It is to be understood that smaller quantities of the stabilizer also may be used but that the stabilizing effect is reduced.

The stabilizer is effective at preventing the precipitation of antimony from spent acid solutions containing the corrosion inhibitor at ambient temperature and at elevated temperature levels.

The antimony compound which is employed in the present invention can comprise any antimony compound which is activated by the other constituents of the corrosion inhibitor to cause the corrosion inhibitor to substantially reduce the corrosive effect of the acid in the aqueous acidic solution on ferrous metals, copper, brass, duplex metals and the like in contact with the acidic solution. The antimony compound can comprise, for example, antimony trioxide, antimony pentoxide, antimony trichloride, antimony pentachloride, potassium pyroantimonate and other alkali metal salts thereof, antimony adducts of ethylene glycol, solutions containing ethylene glycol, water and the oxidized product of hydrogen peroxide and antimony trioxide or any other trivalent antimony compound and the like.

The acetylenic alcohols employed in the present invention may suitably include substantially any of the acetylenic compounds having the general formula:

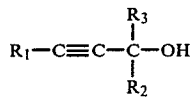

wherein $R_1$, $R_2$ and $R_3$ are hydrogen, alkyl, phenyl, substituted phenyl or hydroxy-alkyl radicals. Preferably, $R_1$ comprises hydrogen. Preferably, $R_2$ comprises hydrogen, methyl, ethyl or propyl radicals. Preferably, $R_3$ comprises an alkyl radical having the general formula $C_nH_{2n}$ where n is an integer from 1 to 10.

Some examples of acetylenic alcohols which can be employed in accordance with the present invention are, for example, methyl butynol, methyl pentynol, hexynol, ethyl octynol, propargyl alcohol, benzylbutynol, ethynylcyclohexanol and the like. Preferred alcohols are hexynol, propargyl alcohol, methyl butynol and ethyl octynol.

The quaternary ammonium compounds employed in the present invention comprise aromatic nitrogen compounds which may be illustrated by alkyl pyridine-N-methyl chloride quaternary, alkyl pyridine-N-benzyl chloride quaternary, quinoline-N-methyl chloride quaternary, quinoline-N-benzyl chloride quaternary, isoquinoline quaternaries, benzoquinoline quaternaries, chloromethyl naphthalene quaternaries of the above, admixtures of the compounds and the like.

The hydrocarbon compound can comprise substantially any aromatic compound which exhibits high oil-wetting characteristics. The aromatic hydrocarbon compound can comprise, for example, xylenes, saturated biphenyl-xylenes admixtures, heavy aromatic naphtha, heavy aromatic solvent, tetralene, tetrahydroquinoline, tetrahydronaphthalene and the like.

The acetylenic alcohol, aromatic hydrocarbon and quaternary amine are present in the corrosion inhibitor in an amount sufficient to effect an activation of the antimony compound whereby the composition can significantly reduce the corrosive effect of an acid on a ferrous metal or other metal in comparison to the reduction in corrosive effect resulting from the use of the individual components or admixtures of less than all the components. Preferably, the acetylenic alcohol is present in the corrosion inhibitor in an amount sufficient to comprise at least five percent by volume of the inhibitor composition. Most preferably, the acetylenic alcohol comprises from about 5 to about 35 percent of the composition. Preferably, the ratio of the volume of acetylenic alcohol to the volume of aromatic hydrocarbons is at least about 0.05:1.0. Most preferably, the ratio of acetylenic alcohol to aromatic hydrocarbon is in the range of from about 0.08:1.0 to about 1.66:1.0. Preferably, a sufficient quantity of the antimony compound is added to obtain a solution having a concentration of from about 0.007 to about 0.04 molar. The antimony compound may be admixed with the other constituents of the corrosion inhibitor composition to form a premixed inhibitor or it may be formulated in situ in an acidic solution by the addition of a sufficient quantity of the antimony compound and a quantity of the other constituents which may be premixed. The quaternary amine and any additional additives constitute the remainder of the corrosion inhibitor.

Additional additives which can be present in the corrosion inhibitor can comprise, for example, a solvent such as an alkanol to assist in maintaining the constituents of the corrosion inhibitor as a homogeneous admixture.

Alkanols which can be employed in the present invention are, for example, methyl, ethyl, propyl, isopropyl, butyl, pentyl, hexyl, heptyl, octyl and the higher liquid members of these aliphatic alcohols. Preferably, the quantity of alkanol employed is that which merely is sufficient to maintain the constituents in homogeneous admixture as excess quantities have no demonstrable effect on the effectiveness of the corrosion inhibitor. Preferably, the alkanol comprises less than about fifteen percent by volume of the corrosion inhibitor composition to avoid unnecessary dilution of the inhibitor composition.

The corrosion inhibitor also can include a non-ionic surfactant which facilitates dispersion of the corrosion inhibitor in the aqueous acidic solution.

The non-ionic surfactant can comprise an ethoxylated oleate, tall oils or ethoxylated fatty acids. The 8 to 20 moles of ethylene oxide adducts of octyl phenol, nonyl phenol, tridecyl phenol and the like are preferred. Sufficient non-ionic surfactant is admixed with the other constituents of the corrosion inhibitor to facilitate dispersion of the corrosion inhibitor in the aqueous acidic solution. Preferably, the surfactant comprises less than about 20 percent by volume of the corrosion inhibitor composition to avoid unnecessary dilution of the inhibitor composition.

The method of the present invention is carried out in one embodiment by first admixing the aqueous fluid with the acid to provide an acidic solution of a desired concentration. The corrosion inhibitor then is admixed with the solution in an amount sufficient to substantially reduce the corrosion rate of the acid on ferrous metals in contact with the acid. When the corrosion inhibitor is generated in situ in the acidic solution, preferably the acetylenic alcohol, aromatic hydrocarbon quaternary ammonium compound and other additives are admixed prior to addition of the antimony compound. The stabilizer may be admixed with the acidic solution either before or after addition of the antimony compound. The amount of corrosion inhibitor utilized in the practice of the invention can vary over a substantial range. Preferably, the inhibitor is present in an amount of from about 10 to about 30 gallons per 1,000 gallons of acidic solution. The quantity of corrosion inhibitor will depend upon the concentration of the acid employed and the temperature at which the acidic solution will contact the metal surfaces.

The aqueous acidic solution of the present invention can be prepared in any suitable tank equipped with suitable mixing means well known to individuals skilled in the art. The solution may be transferred either at a controlled rate directly into the well bore or into a convenient storage tank for injection down the well bore.

The aqueous acidic solution is introduced into the subterranean formation whereby either foreign material in the well bore or in the formation or formation materials are dissolved to thereby increase the permeability of the formation. The increased permeability permits better flow of hydrocarbon fluids through the formation and into its well bore. The pumping rate and pressure utilized will depend upon the characteristics of the formation and whether or not fracturing of the formation is desired. After the aqueous acidic solution has been injected, the well may be shut in and allowed to stand for a period of several hours or more depending on the type of acid employed and the formation treated. If there is pressure on the well, pressure then can be released and the spent or at least partially spent aqueous acidic solution, containing salts formed by the reaction of the acid, is permitted to flow back into the well bore and is pumped or flowed to the surface for appropriate disposal. The stabilizer contained within the at least partially spent acid substantially prevents the precipitation of any antimony compounds within the subterranean formation. The well then can be placed on production or used for other purposes.

To further illustrate the effectiveness of the stabilizer of the present invention in preventing the precipitation of antimony compounds from the corrosion inhibitor employed in the aqueous acidic solution, but not by way of limitation, the following examples are provided.

EXAMPLE I

To determine the effectiveness of the stabilizer of the present invention as a constituent of the corrosion inhibitor, the following tests were performed. An acidic aqueous solution is prepared by adding a sufficient quantity of concentrated hydrochloric acid to water to form a 15 percent HCl solution. A corrosion inhibitor composition is prepared in accordance with the present invention as hereinbefore described by admixing the following constituents: a quaternary ammonium compound, a heavy aromatic hydrocarbon compound, acetylenic alcohol, a surfactant comprising an ethoxylated phenol and a surfactant comprising an alkanol. A quantity of the various antimony compounds identified in Table I, hereafter, then is admixed with samples of the acidic solution and co-mixed with the other constituents of the corrosion inhibitor. The antimony compound is present in an amount to produce a solution containing a 0.04 molar concentration. A quantity of Iceland Spar chips (calcium carbonate) is admixed with a portion of the sample solution to spend a significant portion of the acid present in the sample to determine if a precipitate would form in the solution upon acid spending. The results are set forth in Table I. A quantity of the stabilizer identified in the Table I then was admixed with the remaining sample solution in an amount sufficient to provide a 0.04 molar concentration in the sample solution. A quantity of Iceland Spar chips are admixed with the stabilized corrosion inhibitor solution to spend at least a significant portion of the acid present. The results of the acid spending are set forth in Table I, below.

TABLE I

| Sample No. | Antimony Compound Present | Stabilizer Present | Fluid Sample | |
|---|---|---|---|---|
| | | | 15% HCl | Spent 15% HCl |
| 1 | $Sb_2O_3$ | — | S[1] | ppt[2] |
| 2 | $Sb_2O_3$ | HF | S | S |
| 3 | $Sb_2O_3$ | Tartaric Acid | S | S |
| 4 | $Sb_2O_5$[3] | — | S | ppt |
| 5 | $Sb_2O_5$[3] | HF | S | S |
| 6 | $Sb_2O_5$[3] | Tartaric Acid | S | S |
| 7 | $SbCl_3$ | — | S | ppt |
| 8 | $SbCl_3$ | HF | S | S |
| 9 | $SbCl_3$ | Tartaric Acid | S | S |
| 10 | $SbCl_5$ | — | S | ppt |
| 11 | $SbCl_5$ | HF | S | S |
| 12 | $SbCl_5$ | Tartaric Acid | S | S |

[1] S: soluble
[2] ppt: precipitate formed
[3] $Sb_2O_5$: solution heated to 325° F. to effect dissolution of antimony compound then cooled to ambient The data set forth above clearly illustrates the effectiveness of the stabilizer of the present invention in substantially preventing the precipitation of insoluble antimony-containing compounds from at least partially spent acidic solutions containing the same.

EXAMPLE II

To determine the effectiveness of the stabilizer of the present invention as a constituent of the corrosion inhibitor in the presence of acidic solutions containing hydrogen sulfide, the following tests were performed. A corrosion inhibitor composition and acidic solution are prepared as in Example I. Various samples are prepared containing the antimony compound and stabilizer in an amount sufficient to provide a 0.04 molar concentration as identified in Table II. A quantity of a 5 percent hydrogen sulfide containing solution then is admixed with the sample solutions to determine whether or not a precipitate will form in the solution. The solutions are substantially spent by the addition of Iceland Spar chips. The results of the tests are set forth in Table II, below.

TABLE II

| Sample No. | Antimony Compound Present | Stabilizer Present | $H_2S$ Containing Fluid Sample | |
|---|---|---|---|---|
| | | | 15% HCl | Spent 15% HCl |
| 1 | $Sb_2O_3$ | — | ppt | ppt |
| 2 | $Sb_2O_3$ | HF | S | clouding[1] |
| 3 | $Sb_2O_5$ | — | S | ppt |

TABLE II-continued

| Sample No. | Antimony Compound Present | Stabilizer Present | H₂S Containing Fluid Sample | |
|---|---|---|---|---|
| | | | 15% HCl | Spent 15% HCl |
| 4 | Sb₂O₅ | HF | S | clouding[1] |

[1]No significant precipitate occurred, clouding occurred after standing for 24 hours The results set forth above clearly illustrate the effectiveness of the stabilizer in substantially preventing precipitation of acid-soluble antimony compounds from substantially spent acid solutions.

While particular embodiments of the invention have been described, it is to be understood that such descriptions are presented for purposes of illustration only and that the invention is not limited thereto and that reasonable variations and modifications, which will be apparent to those skilled in the art, can be made without departing from the spirit of scope of the invention as set forth in the appended claims.

What is claimed is:

1. A method of inhibiting the corrosivity of a corrosive acid employed in acidizing subterranean formations in contact with a metal at elevated temperatures which comprises adding to said corrosive acid an inhibiting effective amount of a stabilized corrosion inhibitor composition comprising:
   at least one acetylenic alcohol having the general formula

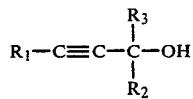

wherein $R_1$, $R_2$ and $R_3$ are selected from the group consisting of hydrogen, alkyl, phenyl, substituted phenyl and hydroxy-alkyl radicals;
   a quaternary aromatic ammonium compound;
   an aromatic hydrocarbon compound which exhibits high oil-wetting characteristics;
   an antimony compound capable of activation by the other constituents of said corrosion inhibitor composition whereby the corrosivity of said corrosive acid in contact with said ferrous metal is reduced, said antimony compound comprising at least one member selected from group consisting of antimony trioxide, antimony pentoxide, antimony trichloride, antimony pentachloride, alkali metal salts of pyroantimonate, antimony adducts of ethylene glycol and solutions containing ethylene glycol, water and the oxidized product of hydrogen peroxide at least one member selected from the group consisting of trivalent antimony compounds; and,
   a stabilizer comprising at least one member selected from the group consisting of reactive fluoride-containing compounds, compounds having alpha-hydroxy or beta-hydroxy organic acid functional groups, or non-organic acid polyhydroxy compounds having from 3 to 9 carbon atoms, present in an amount effective for preventing substantial precipitation of said antimony compound from at least partially spent acid solutions containing said corrosion inhibitor.

2. The method of claim 1 wherein said stabilizer comprises at least one member selected from the group consisting of hydrofluoric acid, lactic acid, glycolic acid, citric acid, tartaric acid, alkali metal fluorides, alkaline earth fluorides, rare earth fluorides, transition metal fluorides, ammonium fluoride, ammonium bifluoride, alkali metal salts of citric, tartaric, lactic and glycolic acid, 3,4-dihydroxy 1,6-hexanedioic acid, 3-hydroxyl propionic acid and 3-hydroxyl butanoic acid, sorbitol, glycerol, mannitol, perseitol, glucose, mannose, xylitol, altritol, iditol, ribitol and erythritol.

3. The method of claim 1 wherein the molar ratio of the stabilizer to the antimony compound present in said composition is at least about 1.

4. The method of claim 1 wherein said corrosion inhibitor composition contains a solvent effective amount of an alkanol.

5. The method of claim 1 wherein said corrosion inhibitor composition contains a non-ionic surfactant.

6. The method of claim 1 wherein the volumetric ratio of said acetylenic alcohol to said hydrocarbon having high oil-wetting characteristics is in the range of from about 0.08:1 to about 1.66:1.

7. The method of claim 1 wherein said corrosion inhibitor composition is present in said acidic solution in an amount of at least about 0.5 percent by volume of said acidic solution.

8. A stabilized acidic composition containing antimony compounds for use in acidizing subterranean formations comprising:
   an aqueous ferrous metal corrosive acid;
   a corrosion inhibitor composition comprising at least one acetylenic alcohol having the general formula

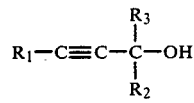

wherein $R_1$, $R_2$ and $R_3$ are selected from the group consisting of hydrogen, alkyl, phenyl, substituted phenyl and hydroxy-alkyl radicals;
   a quaternary aromatic ammonium compound;
   an aromatic hydrocarbon compound which exhibits high oil-wetting characteristics;
   an antimony compound capable of activation by the other constituents of said corrosion inhibitor composition whereby the corrosivity of said corrosive acid in contact with said ferrous metal is reduced, said antimony compound comprising at least one member selected from the group consisting of antimony trioxide, antimony pentoxide, antimony trichloride, antimony pentachloride, alkali metal salts of pyroantimonate, antimony adducts of ethylene glycol and solutions containing ethylene glycol, water and the oxidized product of hydrogen peroxide and at least one member selected from the group consisting of trivalent antimony compounds; and,
   a stabilizer comprising at least one member selected from the group consisting of reactive fluoride-containing compounds, compounds having alpha-hydroxy or beta-hydroxy organic acid functional groups or non-organic acid polyhydroxy compounds having from 3 to 9 carbon atoms, present in an amount effective for preventing substantial precipitation of said antimony compound from at least partially spent acid solutions containing said corrosion inhibitor.

9. The composition of claim 8 wherein said corrosion inhibitor composition contains a solvent effective amount of an alkanol.

10. The composition of claim 8 wherein said corrosion inhibitor composition contains a surfactant.

11. The composition of claim 8 wherein the volumetric ratio of said acetylenic alcohol to said hydrocarbon in said corrosion inhibitor is in the range of from about 0.08:1.0 to about 1.66:1.

12. The composition of claim 8 wherein said acetylenic alcohol comprises from about 5 percent to about 35 percent by volume of said corrosion inhibitor composition.

13. The composition of claim 8 wherein said stabilizer comprises at least one member selected from the consisting of hydrofluoric acid, lactic acid, glycolic acid, citric acid, tartaric acid, alkali metal fluorides, alkaline earth fluorides, rare earth fluorides, transition metal fluorides, ammonium fluoride, ammonium bifluoride, alkali metal salts of citric, tartaric, lactic and glycolic acid, 3,4-dihydroxy 1,6-hexanedioic acid, 3-hydroxyl propionic acid, 3-hydroxyl butanoic acid, sorbitol, glycerol, mannitol, perseitol, glucose, mannose, xylitol, altritol, iditol, ribitol and erythritol.

14. The composition of claim 8 wherein the molar ratio of the stabilizer to the antimony compound present in said composition is at least about 1.

15. A stabilized antimony compound containing corrosion inhibitor composition comprising:
a stabilizer comprising at least one member selected from the group consisting of hydrofluoric acid, lactic acid, glycolic acid, citric acid, tartaric acid, alkali metal fluorides, alkaline earth fluorides, rare earth fluorides, transition metal fluorides, ammonium fluoride, ammonium bifluoride, alkali metal salts of citric, tartaric, lactic and glycolic acid, 3,4-dihydroxy 1,6-hexanedioic acid, 3-hydroxyl propionic acid, 3-hydroxyl butanoic acid, sorbitol, glycerol, mannitol, perseitol, glucose, mannose, xylitol, altritol, iditol, ribitol and erythritol, said stabilizer being present in said inhibitor composition in an amount effective for preventing the substantial precipitation of an antimony compound from partially spent acid solutions containing said corrosion inhibitor;

a corrosion-reducing effective amount of at least one acetylenic alcohol having the general formula:

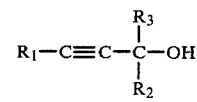

wherein $R_1$, $R_2$ and $R_3$ are selected from the group consisting of hydrogen, alkyl, phenyl, substituted phenyl and hydroxy-alkyl radicals, a quaternary aromatic ammonium compound, an hydrocarbon compound comprising at least one member selected from the group consisting of xylenes, biphenylxylene admixtures, heavy aromatic naphtha, heavy aromatic solvent, tetralene, tetrahydroquinoline and tetrahydronaphthalene, and an antimony compound comprising at least one member selected from the group consisting of antimony trioxide, antimony pentoxide, antimony trichloride, antimony pentachloride, alkali metal salts of pyroantimonate, antimony adducts of ethylene glycol and solutions containing ethylene glycol, water and the oxidized product of hydrogen peroxide and at least one member selected from the group consisting of trivalent antimony compounds.

* * * * *